United States Patent
Miyake et al.

(10) Patent No.: US 12,123,227 B2
(45) Date of Patent: Oct. 22, 2024

(54) OPENING-CLOSING MEMBER (71) Applicant: HONDA MOTOR CO., LTD., Tokyo (JP)

(72) Inventors: Yoshinori Miyake, Tokyo (JP); Go Shimizu, Tokyo (JP); Fumiyoshi Mizutani, Tokyo (JP); Takashi Haga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 17/678,011

(22) Filed: Feb. 23, 2022

(65) Prior Publication Data
US 2022/0282529 A1  Sep. 8, 2022

(30) Foreign Application Priority Data

Mar. 2, 2021  (CN) .......................... 202110231748.2

(51) Int. Cl.
| E05B 79/06 | (2014.01) |
| B60J 5/10 | (2006.01) |
| B60R 11/04 | (2006.01) |
| B62D 25/12 | (2006.01) |
| E05B 69/02 | (2006.01) |
| E05B 79/02 | (2014.01) |
| E05B 79/04 | (2014.01) |
| E05B 81/76 | (2014.01) |

(Continued)

(52) U.S. Cl.
CPC ............... *E05B 79/06* (2013.01); *B60J 5/107* (2013.01); *B60R 11/04* (2013.01); *B60J 5/10* (2013.01); *B60J 5/101* (2013.01); *B62D 25/12* (2013.01); *E05B 69/02* (2013.01); *E05B 79/02* (2013.01); *E05B 79/04* (2013.01); *E05B 81/76* (2013.01); *E05B 83/18* (2013.01); *E05B 85/02* (2013.01); *E05B 85/06* (2013.01); *E05B 85/10* (2013.01); *E05Y 2900/532* (2013.01); *E05Y 2900/548* (2013.01)

(58) Field of Classification Search
CPC .......... E05B 79/06; E05B 81/76; E05B 83/18; E05B 85/10; E05B 79/04; E05B 79/02; E05B 85/02; E05B 85/06; B60J 5/107; B60J 5/101; B60J 5/10; B60R 11/04; E05Y 2900/532; E05Y 2900/548; B62D 25/12
USPC ....................................................... 296/146.8
See application file for complete search history.

(56) References Cited

U.S. PATENT DOCUMENTS

| 5,906,073 | A | * | 5/1999 | Hori | .......................... | B60J 5/107 |
| | | | | | | 49/394 |
| 2003/0071481 | A1 | * | 4/2003 | Igarashi | ................... | B60J 5/101 |
| | | | | | | 296/76 |
| 2006/0119113 | A1 | | 6/2006 | Ishiguro | | |

FOREIGN PATENT DOCUMENTS

JP  2006160088 A  6/2006

* cited by examiner

*Primary Examiner* — Joseph D. Pape
*Assistant Examiner* — Dana D Ivey
(74) *Attorney, Agent, or Firm* — CKC & Partners Co., LLC (57) ABSTRACT

An opening-closing member including an outer panel that faces an outside of a vehicle body, and opening and closing a rear opening of the vehicle body in response to operation of an operation part arranged at a rear end part, the opening-closing member including a bracket member in the operation part, the bracket member including a bracket member body extending along a vehicle body front-rear direction, and a vertical wall extending in a vehicle body vertical direction from at least one end part of the bracket member body in the (Continued)

vehicle body front-rear direction, the vertical wall being fixed to an inner side of the outer panel.

6 Claims, 5 Drawing Sheets

(51) Int. Cl.
*E05B 83/18* (2014.01)
*E05B 85/02* (2014.01)
*E05B 85/06* (2014.01)
*E05B 85/10* (2014.01)

OPENING-CLOSING MEMBER

This application is based on and claims the benefit of priority from Chinese Patent Application No. 202110231748.2, filed on 2 Mar. 2021, the content of which is incorporated herein by reference.

BACKGROUND OF THE INVENTION

Field of the Invention

The present invention relates to an opening-closing member.

Related Art

Conventionally, an opening-closing member that is attached to a rear opening of a vehicle body in an openable and closable manner, and opens and closes a rear opening in response to operation of an operation part arranged at a rear part has been known (for example, see Patent Document 1). The operation part of the opening-closing member is provided with switch means. A cover member made of rubber having watertightness and elasticity Is attached from the outside of the vehicle body to the switch means.

Patent Document 1: Japanese Unexamined Patent Application, Publication No. 2006-160088

SUMMARY OF THE INVENTION

When the opening-closing member is operated, a load is applied via the cover member. Unfortunately, the cover member is made of rubber having elasticity, thereby causing a problem in that the strength and rigidity are insufficient against loads that are in an opening direction and a closing direction and are applied to the opening-closing member.

The present invention has an object to provide an opening-closing member that can improve the strength and the rigidity against the load in the opening direction and the closing direction applied to the opening-closing member.

(1) An opening-closing member (e.g., a rear gate 1) according to an embodiment of the present invention has an outer panel (e.g., an outer panel 11 described later) that faces an outside of a vehicle body (e.g., a vehicle body 100 described later), and opening and closing a rear opening (e.g. a rear opening 101 described later) of the vehicle body in response to operation of an operation part (e.g., an operation part 2 described later) arranged at a rear end part (e.g., a rear end part 1*a* described later). The opening-closing member includes a bracket member (e.g., a bracket member 3 described later) in the operation part, the bracket member including a bracket member body (e.g., a bracket member body 31 described later) extending in a vehicle body front-rear direction and a vertical wall (e.g., a rear vertical wall 33 described later) extending in a vehicle body vertical direction from at least one end part (e.g., a rear end part 31*b* described later) of the bracket member body in the vehicle body front-rear direction, the vertical wall being fixed to an Inner side of the outer panel.

(2) In the opening-closing member according to (1) described above, the bracket member may include a first rib member (e.g., a first rib member 34 described later) in at least one end part (e.g., an end part 31*c*, 31*d* described later) in a vehicle body width direction, the first rib member coupling the bracket member body and the vertical wall to each other while sloping between the bracket member body and the vertical wall.

(3) The opening-closing member according to (1) or (2) described above may further include an inner panel (e.g., an inner panel 13 described later) adjacent to the inner side of the outer panel, wherein the bracket member may be arranged between the outer panel and the inner panel, the vertical wall may include a front vertical wall (e.g., a front vertical wall 32 described later) extending in a vehicle body downward direction from a front end part of the bracket member body, and a rear vertical wall extending in a vehicle body upward direction from a rear end part of the bracket member body, the front vertical wall may be fixed to the inner panel, and the rear vertical wall may be fixed to the outer panel.

(4) In the opening-closing member according to (1) or (2) described above, the bracket member body may have a first opening (e.g., a first opening 35 described later), and the first opening may be provided with an opening switch (e.g., an opening switch 200 described later) configured to automatically open the opening-closing member.

(5) In the opening-closing member according to (4) described above, the bracket member body may have a second opening (e.g., a second opening 36 described later) provided with a camera (e.g., a camera 300 described later).

(6) In the opening-closing member according to (5) described above, the first opening and the second opening may be aligned along a vehicle body width direction, and the bracket member body may include a second rib member (e.g., a second rib member 37 described later) between the first opening and the second opening, the second rib member extending along the vehicle body front-rear direction.

According to (1) described above, the vertical wall extending in the vehicle body vertical direction is provided in at least the rear end part of the bracket member in the vehicle body front-rear direction, which enables the surface of the vertical wall to receive an operation load applied to the operation part during opening and closing operation, thereby allowing the strength and rigidity of the opening-closing member against the operation load to be improved. The vertical wall is fixed to the inner side of the outer panel, thereby allowing the strength to be improved against the load applied to the opening-closing member, via the outer panel in the opening direction and the closing direction of the opening-closing member.

According to (2) described above, the bracket, member is provided with the first rib member that couples the bracket member body and the vertical wall to each other while sloping between the bracket member body and the vertical wall. Consequently, the strength and the rigidity against the force in a twist direction applied to the bracket member during operation of the opening-closing member and attachment of the bracket member can be improved. Accordingly, the strength and the rigidity of the opening-closing member can be further improved.

According to (3) described above, the bracket member is fixed to each of the outer panel of the opening-closing member and to the inner panel different from the outer panel. Consequently, the operation load applied to the bracket member during operation of the operation part of the opening-closing member can be distributed to the outer panel and the inner panel. Accordingly, the stress due to the operation load is not concentrated to the bracket member, and the durability of the bracket member and the operation part is improved.

According to (4) described above, the first opening of the bracket member body is provided with the opening switch, which can improve the strength and the rigidity against the load applied to the opening switch during operation of the opening-closing member.

According to (5) described above, the bracket, member body is provided with the second opening to which the camera is attached, thereby allowing a camera attachment part to be reinforced by the bracket member. No other components for reinforcing the camera attachment part are not required. Accordingly, the number of components can be reduced.

According to (6) described above, reduction in the strength and the rigidity by providing the bracket member body with the first opening and the second opening can be prevented by the second rib member.

DETAILED DESCRIPTION OF THE INVENTION

Figure 1:
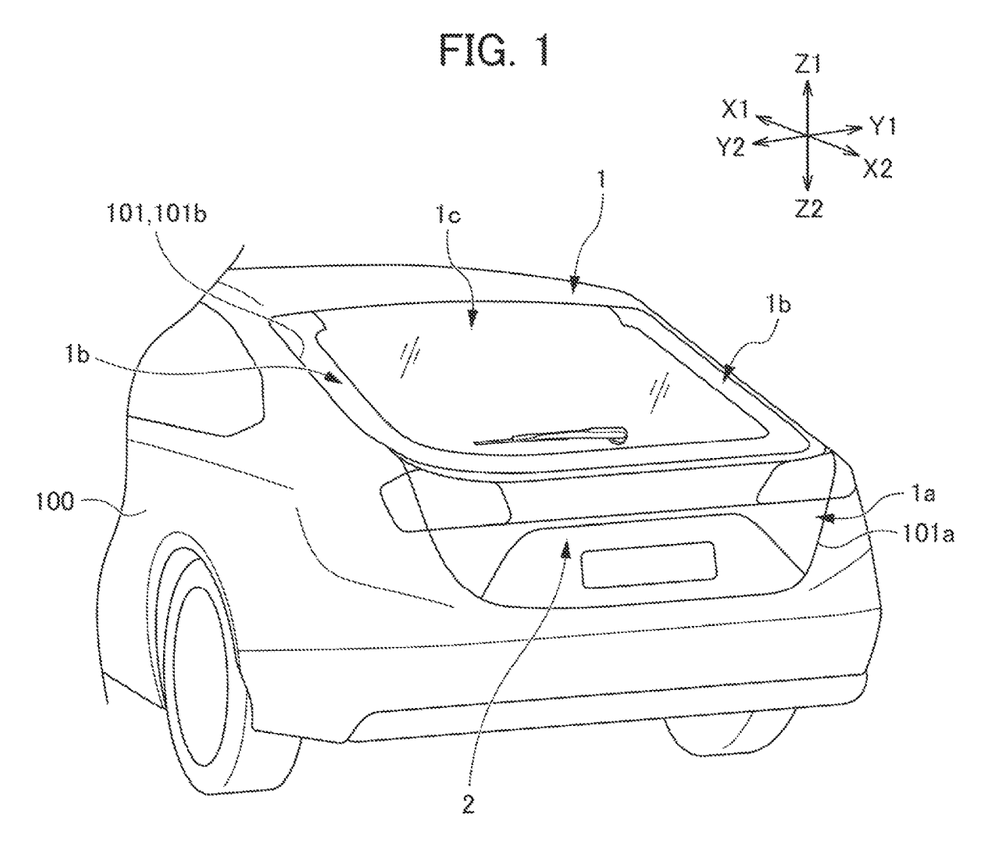
FIG. 1 is a perspective view showing a rear part of a vehicle body to which an opening-closing member is attached.

Hereinafter, referring to the drawings, an embodiment of the present invention is described in detail. As shown in FIG. 1, a rear part of a vehicle body 100 is provided with a rear opening 101. A rear gate 1 is attached to the rear opening 101 in an openable and closable manner.

Note that among directions shown in the diagram, X1-X2 indicates the front-rear direction of the vehicle body 100. The X1 direction is frontward with respect to the vehicle body 100. The X2 direction is rearward with respect to the vehicle body 100. Y1-Y2 indicates the vehicle width direction of the vehicle body 100. Viewed from the rear of the vehicle body 100, the Y1 direction is the right direction of the vehicle body 100, and the Y2 direction is the left direction of the vehicle body 100. Z1-Z2 indicates the vertical direction of the vehicle body 100. The Z1 direction is upward with respect to the vehicle body 100. The Z2 direction is downward with respect to the vehicle body 100.

Figure 2:
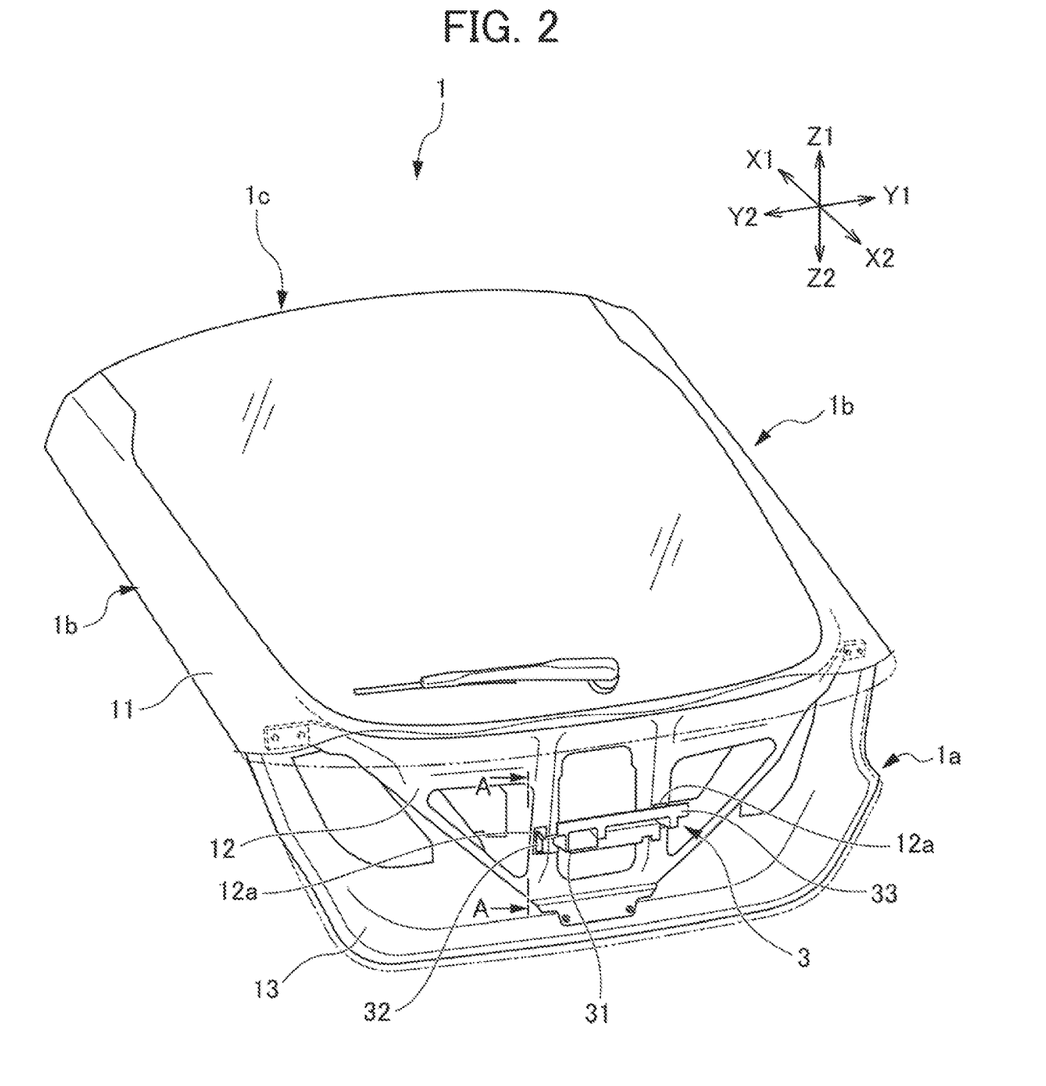
FIG. 2 is a perspective view showing the opening-closing member in a partially exploded manner.

The rear gate 1 is an opening-closing member that opens and closes the rear opening 101 of the vehicle body 100. As shown in FIG. 2, the rear gate 1 includes: a rear end part 1*a* that closes a rear end opening 101*a* of the rear opening 101; a pair of side parts 1*b* and 1*b* that each extend frontward with respect to the vehicle body 100 from the opposite ends of the rear end part 1*a* in the vehicle width direction; and a glass panel 1*c* attached over the rear end part 1*a* and the opposite side parts 1*b* and 1*b*. The opposite side parts 1*b* and 1*b* and the glass panel 1*c* close the upper opening 101*b* of the rear opening 101.

As shown in FIG. 2, the rear gate 1 in this embodiment includes an outer panel 11, a mid panel 12, and an inner panel 13. The outer panel 11 is a panel that is made of resin and constitutes the outer surface of the rear gate 1. The mid panel 12 is a member that is made of a metal, is arranged between the outer panel 11 and the inner panel 13 and constitutes the framework of the rear gate 1 together with the inner panel 13. The inner panel 13 is a panel that is made of resin, and constitutes the inner surface of the rear gate 1. The outer panel 11 and the mid panel 12 extend over the rear end part 1*a* and the opposite side parts 1*b* and 1*b* of the rear gate 1. The rear gate 1 adopts the outer panel 11 and the inner panel 13, which are made of resin. Accordingly, the rear gate 2 is lightweight. Note that FIG. 2 shows part of the outer panel 11 that is arranged at the rear end part 1*a* of the rear gate 1 in an exploded view.

Figure 3:
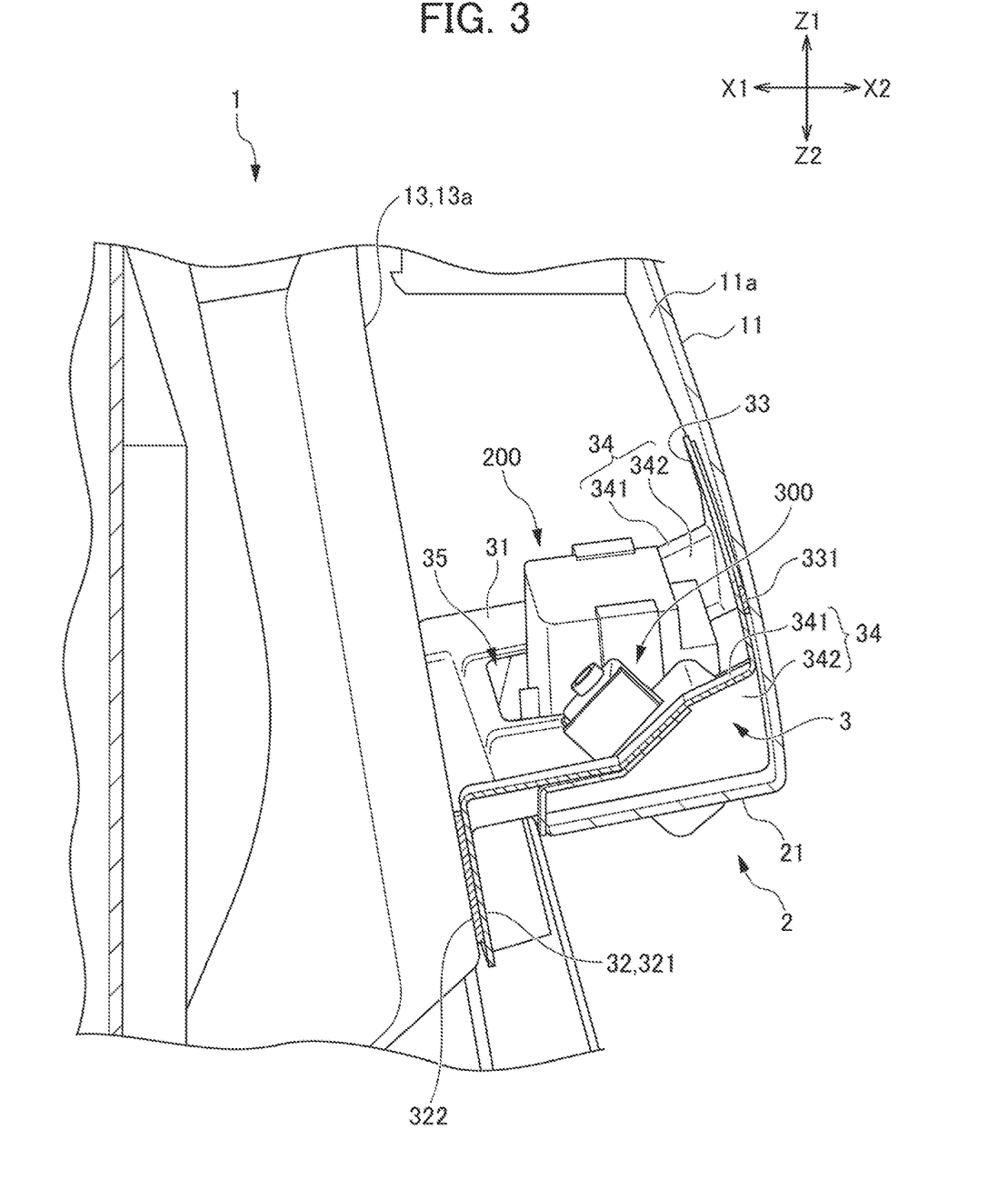
FIG. 3 is a sectional view taken along line A-A in FIG. 2.

As shown in FIGS. 1 and 3, the rear end part 1*a* of the rear gate 1 is provided with an operation part 2 for applying an opening and closing operation to the rear gate 1. The operation part 2 is formed between the outer panel 11 arranged at the rear end part 1*a* of the rear gate 1 and the mid panel 12 by providing the outer panel 11 with a stepped wall 21 that extends in the vehicle body front-rear direction. As shown in FIG. 3, the stepped wall 21 faces downward with respect to the vehicle body. Note that in FIG. 3, illustration of the mid panel 12 is omitted.

Figure 4:
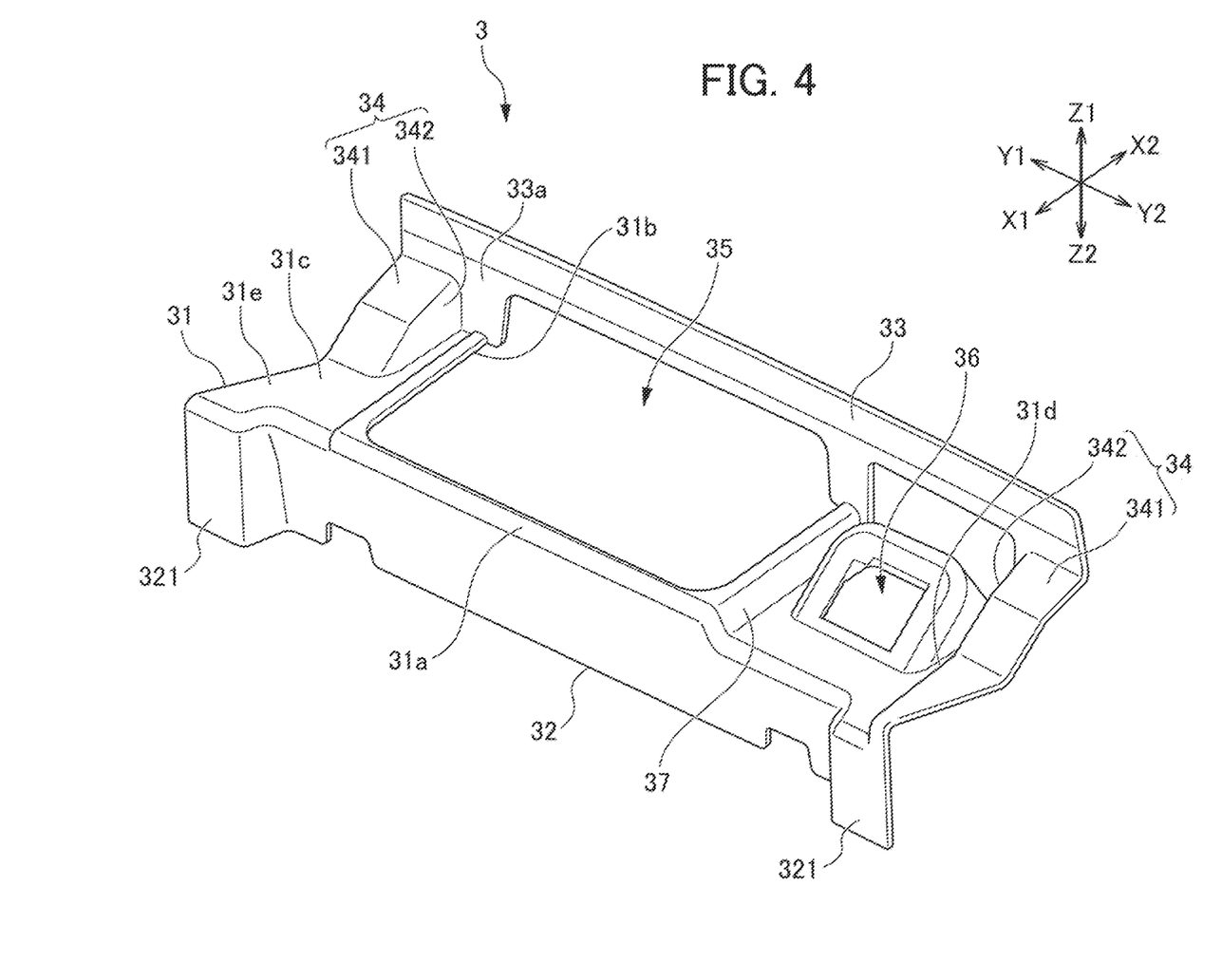
FIG. 4 is a perspective view of a bracket member viewed from the front of the vehicle body.

A bracket member 3 that is a member made of a metal, such as iron or aluminum, is provided in the operation part 2. For more detail, the bracket member 3 is arranged at the operation part 2 of the rear gate 1 between the outer panel 11 and the raid panel 12. As shown in FIG. 4, the bracket member 3 includes a bracket member body 31, and vertical walls that are arranged at the respective end parts of the bracket member body 31 in the vehicle body front-rear direction and extend in the vehicle body vertical direction.

The bracket member body 31 is formed as a laterally longer plate shape that has a length in the vehicle body front-rear direction slightly longer than the length of the stepped wall 21 of the operation part 2 in the vehicle body front-rear direction; and the plate shape is wider in the vehicle body width direction than its length. The bracket member body 31 is arranged over the outer panel 11 and the mid panel 12, with the shorter direction being disposed in the vehicle body front-rear direction.

Figure 5:
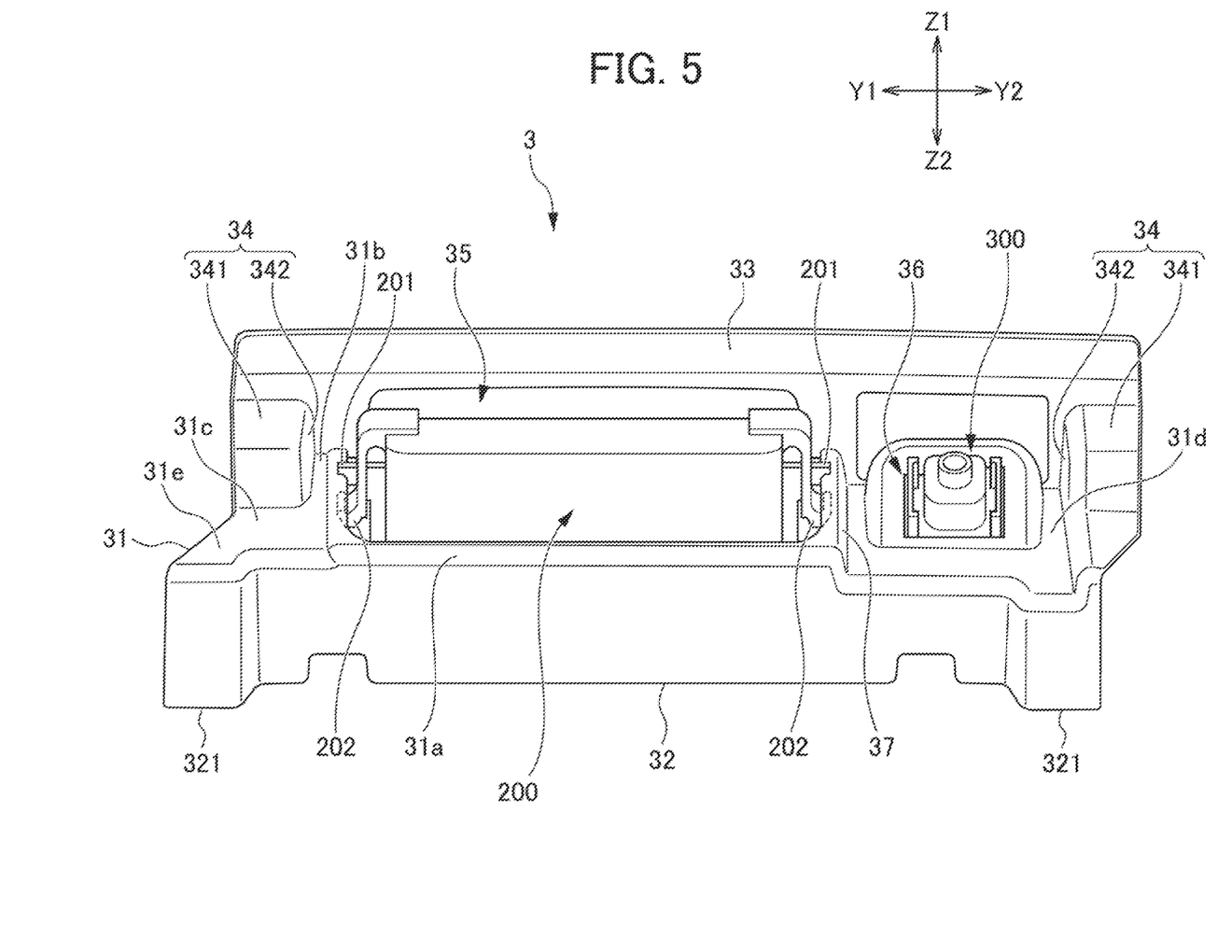
FIG. 5 shows the bracket member to which an opening switch and a camera are attached viewed from the front of the vehicle body.

As shown in FIGS. 3 to 5, the vertical wall in this embodiment includes a front vertical wall 32 integrally provided at a front end part 31*a* of the bracket member body 31, and a rear vertical wall 33 integrally provided at a rear end part 31*b* of the bracket member body 31. The front vertical wall 32 extends from the front end part 31*a* of the bracket member body 31 in the vehicle body downward direction, with the same width as that of the bracket member body 31. The rear vertical wall 33 extends from the rear end part 31*b* of the bracket member body 31 in the vehicle body upward direction, with the same width as that of the bracket member body 31. At the opposite end parts of the front vertical wall 32 in the vehicle body width direction, projecting walls 321 and 321 that each project frontward with respect to the vehicle body are respectively formed.

At the opposite end parts of the front vertical wall 32 in the vehicle body width direction, the pair of projecting walls 321 and 321 that project frontward with respect to the vehicle body are provided. The bracket member 3 is fixed to the inside of the operation part 2 by the pair of projecting walls 321 and 321 and the rear vertical wall 33.

For more detail, as shown in FIG. 2, the mid panel 12 has openings 12*a* and 12*a* at positions corresponding to the respective projecting walls 321 and 321 of the bracket member 3. The projecting walls 321 and 321 of the front vertical wall 32 are in contact with the inner panel 13 through the openings 12*a* and 12*a* of the mid panel 12. As shown in FIG. 3, these walls are fixed to a surface 13*a* of the inner panel 13 with a fixing member 322, such as adhesive or double-stick tape. Furthermore, the rear vertical wall 33 of the bracket member 3 is in contact with the outer panel 11 from the inside of the operation part 2, and is fixed to an inner surface 11a of the outer panel 11 with the fixing member 331, such as adhesive or double-stick tape, as shown in FIG. 3. Note that a surface of the front vertical wall 32 between the projecting walls 321 and 321 may be fixed to the mid panel 12 with double-stick tape or the like.

As described above, the bracket member 3 includes: the bracket member body 31 extending along the vehicle body front-rear direction; and the front vertical wall 32 and the rear vertical wall 33 that extend in the vehicle body vertical direction, at the front end part 31a and the rear end part 31b of the bracket member body 31 in the vehicle body front-rear direction. Among these components, at least the rear vertical wall 33 is fixed to the inner side of the outer panel 11. The rear vertical wall 33 extends in the vehicle body vertical direction. Accordingly, an operation load applied to the operation part 2 during opening and closing operation can be received by the surface of the rear vertical wall 33, which can improve the strength and the rigidity of the rear gate 1 against the operation load to be improved. At least the rear vertical wall 33 is fixed to the inner surface 11a of the outer panel 11, which can improve the strength against loads applied to the rear gate 1 through the outer panel 11 in the opening direction and the closing direction of the rear gate 1. Note that the vertical wall provided for the bracket member 3 may only be the rear vertical wall 33.

The bracket member 3 in this embodiment is arranged between the outer panel 11 and the inner panel 13. The front vertical wall 32 is fixed to the inner panel 13. The rear vertical wall 33 is fixed to the outer panel 11, which is different from the inner panel 13. Accordingly, the operation load applied to the bracket member 3 during operation of the operation part 2 of the rear gate 1 can be distributed to the outer panel 11 and the inner panel 13, thus preventing the stress due to the operation load from being concentrated to the bracket member 3. Accordingly, the durability of the bracket member 3 and the operation part 2 is improved.

As shown in FIG. 4, the bracket member 3 includes first rib members 34 and 34 at the respective opposite end parts 31c and 31c in the vehicle body width direction; the first rib members 34 and 34 couple the bracket member body 31 and the rear vertical wall 33 to each other while sloping between the bracket member body 31 and the rear vertical wall 33. The first rib members 34 and 34 include: inclined surface parts 341 and 341 that each extend in an inclined manner from an upper surface 31e of the bracket member body 31 facing upward with respect to the vehicle body, to a front surface 33a of the rear vertical wall 33 facing frontward with respect to the vehicle body; and inner surface parts 342 and 342 that enclose what is between the inside where the inclined surface parts 341 and 341 face each other and an upper surface 31e of the bracket member body 31 and the front surface 33a of the rear vertical wall 33.

As described above, the bracket member 3 includes the first rib members 34 and 34 that couple the bracket member body 31 and the rear vertical wall 33 to each other while sloping between the bracket member body 31 and the rear vertical wall 33. Consequently, the strength and the rigidity against the force in a twist direction applied to the bracket member 3 during operation of the rear gate 1 and attachment of the bracket member 3 can be improved. Accordingly, the strength and the rigidity of the rear gate 1 can be further improved. Note that the first rib member 34 provided for the bracket member 3 may be provided at only one end part 31c or 31c of the bracket member body 31. Although not shown, the first rib member may be provided so as to couple the bracket member body 31 and the front vertical wall 32 to each other while sloping between the bracket member body 31 and the front vertical wall 32.

As shown in FIG. 4, the bracket member body 31 has a first opening 35. The first opening 35 is formed to have a laterally long rectangular shape having a size indicating a great part of the bracket member body 31, and penetrate through the bracket member body 31. As shown in FIGS. 3 and 5, an opening switch 200 is attached to the first opening 35. The opening switch 200 is a switch for automatically opening the rear gate 1. The opening switch 200 is held without positional deviation in the first opening 35 by the bracket member body 31 being vertically clumped with pairs of upper stops 201 and 201 and lower stops 202 and 202 respectively provided at the opposite end in the vehicle body width direction, from the inside of the first opening 35. As described above, in the bracket member 3 in this embodiment, the opening switch 200 is attached to the first opening 35 provided at the bracket member body 31, thereby allowing the strength and the rigidity to be improved against the load applied to the opening switch 200 during operation of the rear gate 1.

Furthermore, as shown in FIGS. 4 and 5, the bracket member body 31 has a second opening 36. The second opening 36 is arranged so as to be aligned with the first opening 35 along the vehicle body width direction. The second opening 36 is a smaller opening in comparison with the first opening 35, and penetrates through the bracket, member, body 31. A camera 300 for imaging the rearward view of the vehicle body 100 is attached to the second opening 36. As described above, the bracket member 3 is provided with the second opening 36 to which the camera 300 is attached, thereby allowing a camera attachment part to be reinforced by the bracket member 3. No other components for reinforcing the camera attachment part are not required. Accordingly, the number of components can be reduced.

The bracket member body 31 includes a second rib member 37 between the first opening 35 and the second opening 36; the second rib member 37 extends along the vehicle body front-rear direction. The second rib member 37 is formed by making a step at part of the bracket member body 31 between the first opening 35 and the second opening 36. Accordingly, reduction in the strength and the rigidity by providing the bracket member body 31 with the first opening 35 and the second opening 36 can be prevented by the second rib member 37. In this embodiment, with respect to the second rib member 37 serving as a boarder, the second opening 36 is arranged lower in the vehicle body than the first opening 35. Alternatively, the first opening 35 may be arranged lower in the vehicle body than the second opening 36.

What is claimed is:

1. An opening-closing member having an outer panel that faces an outside of a vehicle body, and opening and closing a rear opening of the vehicle body in response to operation of an operation part arranged at a rear end part, the opening-closing member comprising:
a bracket member in the operation part,
the bracket member including a bracket member body extending along a vehicle body front-rear direction and a vertical wall extending in a vehicle body vertical direction from at least one end part of the bracket member body in the vehicle body front-rear direction, the vertical wall being fixed to an inner side of the outer panel, wherein the bracket member includes a first rib member in at least one end part in a vehicle body width direction, the first rib member coupling the bracket member body and the vertical wall to each other while sloping between the bracket member body and the vertical wall.

2. The opening-closing member according to claim 1, further comprising:
an inner panel adjacent to the inner side of the outer panel,
wherein the bracket member is arranged between the outer panel and the inner panel,
wherein the vertical wall includes a front vertical wall extending in a vehicle body downward direction from a front end part of the bracket member body, and a rear vertical wall extending in a vehicle body upward direction from a rear end part of the bracket member body,
wherein the front vertical wall is fixed to the inner panel, and
wherein the rear vertical wall is fixed to the outer panel.

3. An opening-closing member having an outer panel that faces an outside of a vehicle body, and opening and closing a rear opening of the vehicle body in response to operation of an operation part arranged at a rear end part, the opening-closing member comprising:
a bracket member in the operation part,
the bracket member including a bracket member body extending along a vehicle body front-rear direction and a vertical wall extending in a vehicle body vertical direction from at least one end part of the bracket member body in the vehicle body front-rear direction, the vertical wall being fixed to an inner side of the outer panel,
wherein the bracket member body has a first opening, and
wherein the first opening is provided with an opening switch configured to automatically open the opening-closing member.

4. The opening-closing member according to claim 3,
wherein the bracket member body includes a second opening provided with a camera.

5. The opening-closing member according to claim 4,
wherein the first opening and the second opening are aligned along a vehicle body width direction, and
wherein the bracket member body includes a second rib member between the first opening and the second opening, the second rib member extending along the vehicle body front-rear direction.

6. The opening-closing member according to claim 3, further comprising:
an inner panel adjacent to the inner side of the outer panel,
wherein the bracket member is arranged between the outer panel and the inner panel,
wherein the vertical wall includes a front vertical wall extending in a vehicle body downward direction from a front end part of the bracket member body, and a rear vertical wall extending in a vehicle body upward direction from a rear end part of the bracket member body,
wherein the front vertical wall is fixed to the inner panel, and
wherein the rear vertical wall is fixed to the outer panel.

* * * * *